(12) United States Patent
Rinne et al.

(10) Patent No.: US 6,252,781 B1
(45) Date of Patent: *Jun. 26, 2001

(54) ACTIVE RESET FORWARD CONVERTER EMPLOYING SYNCHRONOUS RECTIFIERS

(75) Inventors: Karl Rinne, Waterford; Joseph Duigan, Cork; Frank Keane, Waterford, all of (IL)

(73) Assignee: Artesyn Technologies, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/570,800

(22) Filed: May 15, 2000

Related U.S. Application Data

(63) Continuation of application No. 09/153,377, filed on Sep. 15, 1998, now Pat. No. 6,081,432.
(60) Provisional application No. 60/086,835, filed on May 26, 1998.

(51) Int. Cl.⁷ .................................................... H02M 3/335
(52) U.S. Cl. .................. 363/16; 363/17; 363/20
(58) Field of Search .................. 363/16, 17, 20, 363/21, 97, 98, 131, 89

(56) References Cited

U.S. PATENT DOCUMENTS

| Re. 36,098 | 2/1999 | Vinciarelli . |
|---|---|---|
| 4,441,146 | 4/1984 | Vinciarelli . |
| 4,716,514 | 12/1987 | Patel . |
| 4,788,634 | 11/1988 | Schlecht et al. . |
| 4,809,148 | 2/1989 | Barn . |
| 4,857,822 | 8/1989 | Tabisz et al. . |
| 4,870,555 | 9/1989 | White . |
| 4,903,189 | 2/1990 | Ngo et al. . |
| 5,027,264 | 6/1991 | DeDoncker et al. . |
| 5,066,900 | 11/1991 | Bassett . |
| 5,099,406 | 3/1992 | Bassett . |
| 5,126,931 | 6/1992 | Jitaru . |
| 5,126,938 | 6/1992 | Oda . |
| 5,291,382 | 3/1994 | Cohen . |
| 5,303,138 | 4/1994 | Rozman . |
| 5,304,875 | 4/1994 | Smith . |
| 5,430,633 | 7/1995 | Smith . |
| 5,434,768 | 7/1995 | Jitaru et al. . |
| 5,528,482 | 6/1996 | Rozman . |
| 5,535,112 | 7/1996 | Vazquez-Lopez et al. . |
| 5,708,571 | 1/1998 | Shinada . |
| 5,742,491 | 4/1998 | Bowman et al. . |

FOREIGN PATENT DOCUMENTS

| 0 618 666 A2 | 10/1994 | (EP) . |
|---|---|---|
| 474471 B1 | 5/1996 | (EP) . |
| 610158 B1 | 6/1996 | (EP) . |

OTHER PUBLICATIONS

Carsten, "High Power SMPS Require Intrinsic Reliability", PCI '81 Proceedings Conference, Sep. 14–17.

(List continued on next page.)

Primary Examiner—Rajnikant B. Patel
(74) Attorney, Agent, or Firm—Kirkpatrick & Lockhart LLP

(57) ABSTRACT

A converter comprises a first switch (102) for connecting an input DC voltage to a primary winding (103) of a transformer (104), a second switch (105) for connecting a reset voltage to the transformer, and first and second synchronous rectifiers (109, 110) within a filter circuit (108) for receiving an output voltage waveform from a secondary winding (107) of the transformer and generating therefrom a DC output voltage. The synchronous rectifiers are controlled by the secondary winding. A first one of the synchronous rectifiers (109) couples the secondary winding to an output terminal of the power supply to provide output power during part of the switching cycle. The second synchronous rectifier (110) serves as a "flywheel" for providing load current during a second part of the switching cycle when the first synchronous rectifier is off. The timing of the first and second switches is arranged to prevent simultaneous conduction of the synchronous rectifiers.

59 Claims, 8 Drawing Sheets

OTHER PUBLICATIONS

Kagan, et al., "Improving Power Supply Efficiency With MOSFET Synchronous Rectifiers", Proceeding of Powercon 9, Ninth International Solid–State Power Electronics conference, pp. 1–5, Jul. 13–15, 1982.

Alexander et al., "MOSFET's Move in On Low Voltage Rectification", Applications Handbook, Siliconix Technology Article, Siliconix Inc., pp. 569–580, 1984; No Date.

Tarter, "Principles of Solid–State Power Conversion", pp. 544–547, 1985 No Date.

Carsten, et al., "Design Tricks, Techniques and Tribulations at High Conversion Frequencies", HFPC Apr. 1987 Proceedings, pp. 139–152.

Tabisz, et al., "A MOSFET Resonant Synchronous Recitier For High Frequency DC/DC Converters", PESC '90 Record vol. II, 21 Annual IEEE Power Electronics Specialist Conference, pp. 769–779, 1990 No Date.

Jitaru, "Constant Frequency, Forward Converter With Resonant Transition", High Frequency Power Conversion 1991 Conference, Proceedings 1, pp. 282–292, Jun. 1991.

Kassakian et al., *Principles of Power Electronics*, Addison–Wesley Publishing Co., 1991, p. 37 No Date.

Blanc, "Practical Application Of MOSFET Synchronous Recitifers", Intelec '91, pp. 495–501, (Nov. 1991).

Murakami, et al., "A Simple and Efficient Synchronous Rectifier for Forward DC–DC Converters", Apec '93, Eighth Annual Applied Power Electronics Conference and Exposition, pp. 463–468, Mar. 7–11, 1993.

Acker, et al., "Current–Controlled Synchronous Rectification", Ninth Annual Applied Power Electronics Conference and Exposition, vol. 1, pp. 185–191, Feb. 13–17, 1994.

Jitaru, et al., "High Efficiency DC–DC Converter", IEEE, Apec '94, ninth Annual Applied Power Electronics Conference and Exposition, vol. 2, pp. 638–644, Feb. 13–17, 1994.

ACTIVE RESET FORWARD CONVERTER EMPLOYING SYNCHRONOUS RECTIFIERS

CROSS-REFERENCE TO RELATED APPLICATIONS

This patent application is a continuation of U.S. patent application Ser. No. 09/153,377, filed Sep. 15, 1998, now U.S. Pat. No. 6,081,432, which claims priority based on copending U.S. Provisional patent application Ser. No. 60/086835, filed May 26, 1998.

STATEMENT REGARDING FEDERALLY SPONSORED RESEARCH OR DEVELOPMENT

Not Applicable.

BACKGROUND OF THE INVENTION

This invention pertains to active reset forward converters employing synchronous rectifiers.

Carsten, "High Power SMPS Require Intrinsic Reliability," PCI Proceedings, Sep. 14, 1981, pp. 495–501, describes a single-ended forward converter comprising a reset circuit sometimes referred to as an "active clamp." The active clamp comprises a capacitor and switch coupled to a power transformer for resetting the transformer and preventing saturation. A similar circuit is discussed by Carsten in "Design Tricks, Techniques and Tribulations at High Conversion Frequencies", HFPC, April 1987, pp. 139–152, and "Techniques for Transformer Active Reset Circuits at High Frequencies and Power Levels", HFPC, May 1990, pp. 235–246. The Carsten articles are incorporated herein by reference.

The Carsten circuits employ an output filter circuit comprising diodes for receiving an AC voltage from the transformer secondary winding and generating therefrom a DC output voltage. It is known in the art to replace such diodes with MOSFETs, e.g. as described by James Blanc in "Practical Application of MOSFET Synchronous Rectifiers," published at the Intelec '91 conference, incorporated herein by reference.

FIG. 1 illustrates a prior art circuit including a reset circuit combined with synchronous rectifiers. FIG. 1 includes a DC input voltage source 1. A main power switch 2 periodically turns on and off for coupling the DC input voltage across a primary winding 3 of an isolation transformer 4. A reset switch 5 and a capacitor 6 are included in this circuit. When main power switch 2 is off, switch 5 is closed, thereby coupling the series combination of capacitor 6 and input voltage source 1 across winding 3. Capacitor 6 typically stores a DC voltage such that the sum of the DC voltage on capacitor 6 plus the DC input voltage from supply 1 is sufficient to reset transformer 4 when switch 5 is closed. Thus, when switch 2 is closed, a positive DC input voltage is applied across primary winding 3, and when switch 5 is closed, a negative DC voltage (equal to the input voltage plus the voltage across capacitor 6) is applied across winding 3 to reset transformer 4.

Transformer 4 includes a secondary winding 7 coupled to a filter/rectifier circuit 8. Filter/rectifier circuit 8 includes synchronous rectifiers 9 and 10, an inductor 11 and a capacitor 12. Circuit 8 receives an output voltage waveform from secondary winding 7 and generates in response thereto a DC output voltage across output leads 13, 14. Synchronous rectifiers 9, 10 are MOS transistors, including parasitic diodes 9d, 10d coupled across their source and drain.

When switch 2 is closed, a positive voltage is present across winding 3, thereby causing a positive voltage across winding 7, which turns on synchronous rectifier 9 and turns off synchronous rectifier 10. When switch 5 is closed, a negative voltage is present across winding 3, thereby causing a negative voltage across winding 7, which turns off synchronous rectifier 9 and turns on synchronous rectifier 10. The advantage of using synchronous rectifiers 9, 10 instead of diodes is that the voltage drop across rectifiers 9, 10 is less than the voltage drop across a typical diode (0.7 volts), and therefore, efficiency of this circuit is enhanced.

FIGS. 2A and 2B illustrate the gate voltage applied to MOS switches 2 and 5, respectively. As can be seen, these gate voltages are out of phase. FIG. 2C illustrates the voltage vp across winding 3 caused by transistors 2 and 5 turning on and off.

Unfortunately, the gates 9g, 10g of MOS synchronous rectifiers 9, 10 are typically very capacitive. FIGS. 2D and 2E illustrate the voltage applied to gates 9g, 10g of synchronous rectifiers 9, 10 by secondary winding 7. As can be seen, here is a small time period in which the voltages at gates 9g, 10g are both high, thereby causing a small time period during which both rectifiers 9, 10 conduct, which in turn causes large current pulses P1, P2 to flow through rectifiers 9, 10 when rectifiers 9, 10 are both conducting. (The current through rectifier 9 is illustrated in FIG. 2F.) It would be desirable to eliminate these large current pulses.

SUMMARY

A circuit constructed in accordance with our invention comprises a main power switch for coupling an input voltage source to a primary winding of a transformer and a reset switch for coupling a reset voltage source to the primary winding. In one embodiment, the reset voltage source is a capacitor for storing a reset voltage. The circuit also comprises first and second synchronous rectifiers. One of the synchronous rectifiers acts as a freewheeling diode. The other synchronous rectifier selectively couples the secondary winding to an output filter circuit. The synchronous rectifiers are controlled by the transformer. A control circuit controls the main power switch and the reset switch. The control circuit comprises a delay circuit for providing a delay between the time the input switch opens and the reset switch closes, and a delay between the time the reset switch opens and the input switch closes. In accordance with one novel feature of our invention, this delay is sufficiently long to ensure that there is no time period during which both synchronous rectifiers are conducting.

DETAILED DESCRIPTION

Figure 1:
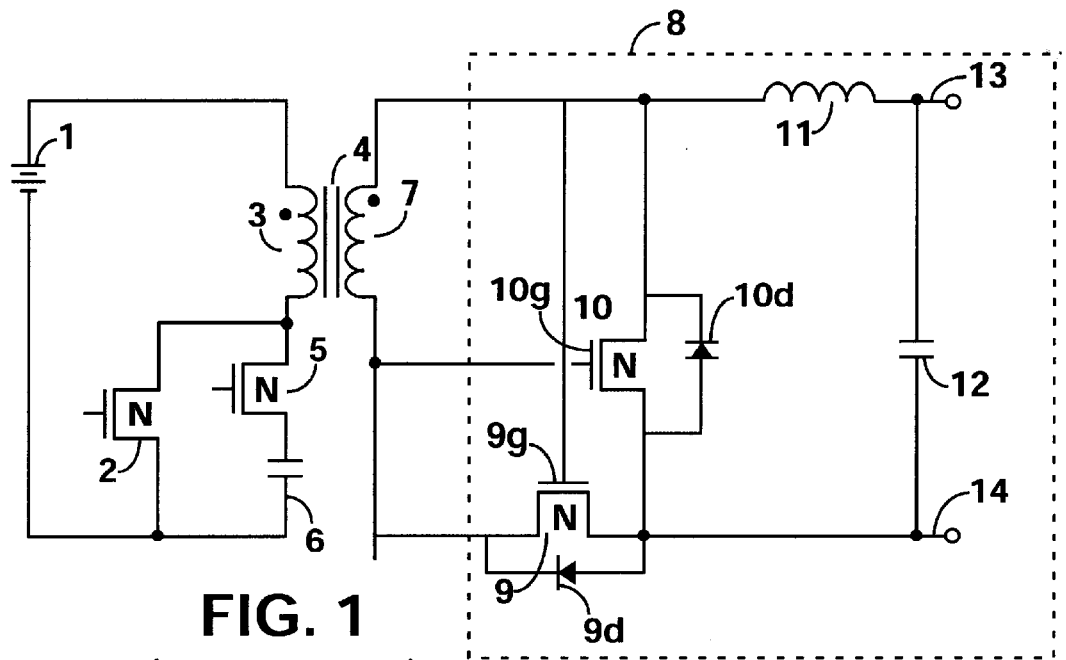
FIG. 1 illustrates a single-ended forward converter constructed in accordance with the prior art which comprises a main power switch, a reset switch, and a pair of synchronous rectifiers.
Figure 3:
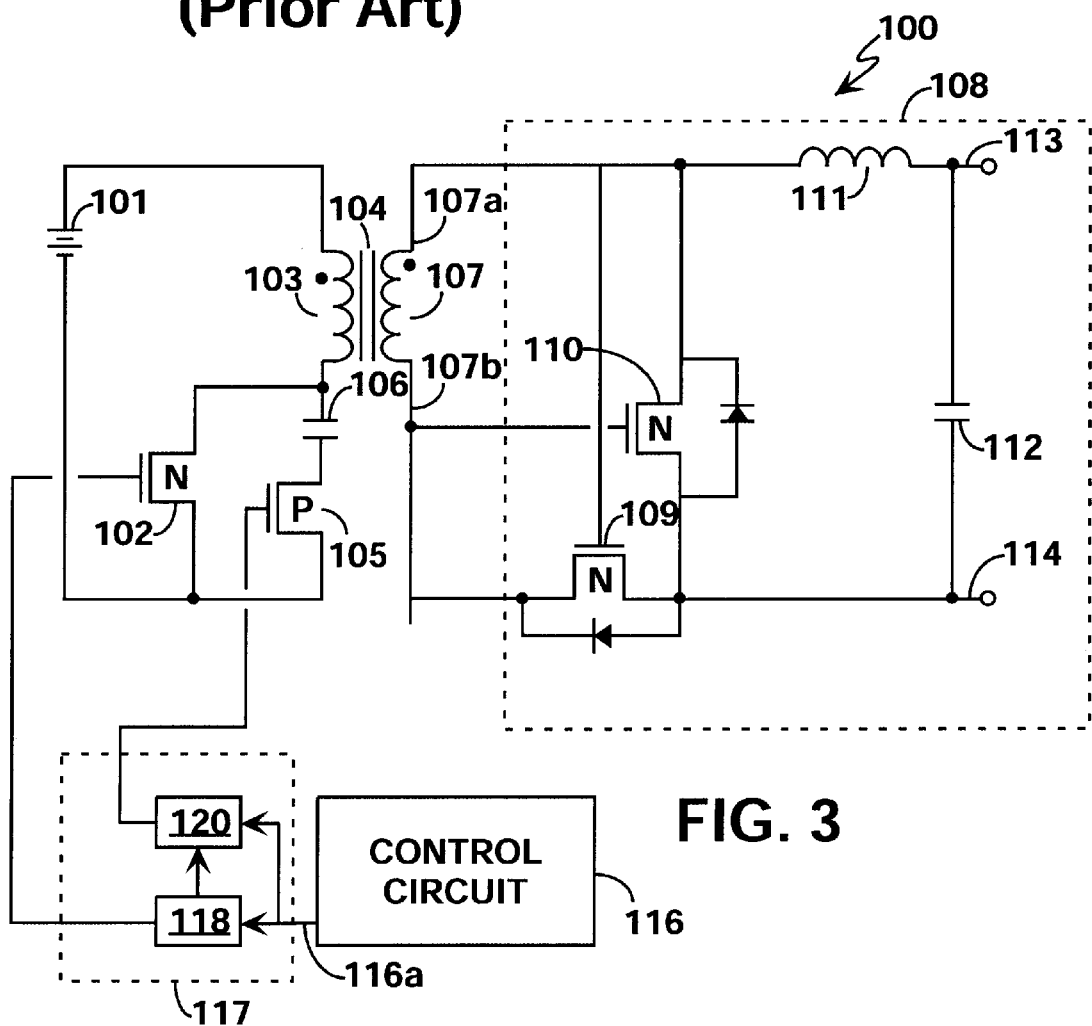
FIG. 3 illustrates a circuit constructed in accordance with our invention comprising a main power switch, a reset switch, a pair of synchronous rectifiers, and a control circuit which provides sufficient delay to ensure that the synchronous rectifiers are not on simultaneously.
Figure 2A:
FIGS. 2A to 2F illustrate currents and voltages through and at various nodes of the circuit of FIG. 1.
Figure 2B:
Figure 2C:
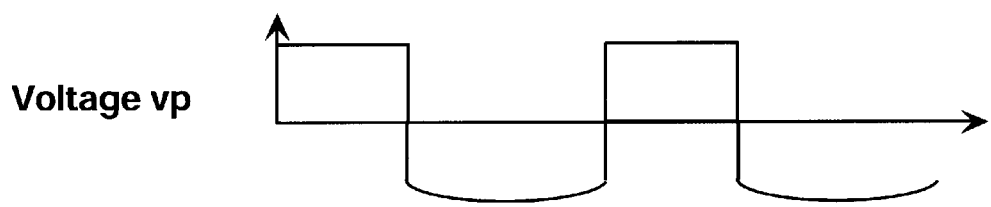
Figure 2D:
Figure 2E:
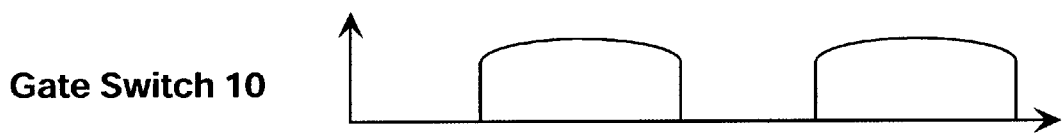
Figure 2F:
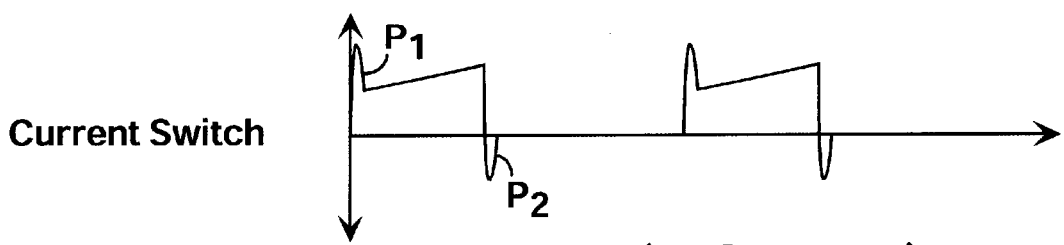

Referring to FIG. 3, a circuit 100 constructed in accordance with our invention comprises a main power switch 102 for connecting an input DC voltage source 101 to a primary winding 103 of a transformer 104. A reset switch 105 and reset voltage source 106 provide a reset voltage across primary winding 103 during the time period in which switch 102 is off. In one embodiment, reset voltage source 106 is a capacitor which stores a reset voltage. The capacitance of capacitor 106 is typically sufficiently large so that in the steady state, over one switching cycle, the voltage across capacitor 106 does not change very much.

Circuit 100 includes a filter circuit 108 including synchronous rectifiers 109, 110 (typically MOS transistors), an inductor 111 and a capacitor 112 for receiving a voltage from secondary winding 107 and providing a DC output voltage at output terminals 113, 114. As can be seen, the control gate 109g of synchronous rectifier 109 is connected to a first terminal 107a of secondary winding 107, and the control gate 110g of synchronous rectifier 110 is coupled to a second terminal 107b of secondary winding 107.

In the embodiment of FIG. 3, transistor 102 and rectifiers 109 and 110 are N channel MOS transistors, and reset transistor 105 is a P channel MOS transistor. However, in other embodiments, these transistors can be other conductivity types, or other types of switches such as bipolar transistors or SCRs.

A control circuit 116 senses the output voltage across leads 113, 114 and in response thereto provides a control signal on an output lead 116a for controlling switches 102 and 105. (The duty cycle of switches 102 and 105 is used by control circuit 116 to control the power supply output voltage.) Of importance, control circuit 116 is coupled to a network 117 comprising delay circuit 118 and delay and logic circuit 120 for providing a delay between the time switch 102 opens and switch 105 closes, and between the time switch 105 opens and switch 102 closes. Because of this delay, there is no overlap time in which both of synchronous rectifiers 109, 110 are closed. This delay time is longer than the time required to prevent the main and reset power switches from conducting simultaneously.

Figure 4A:
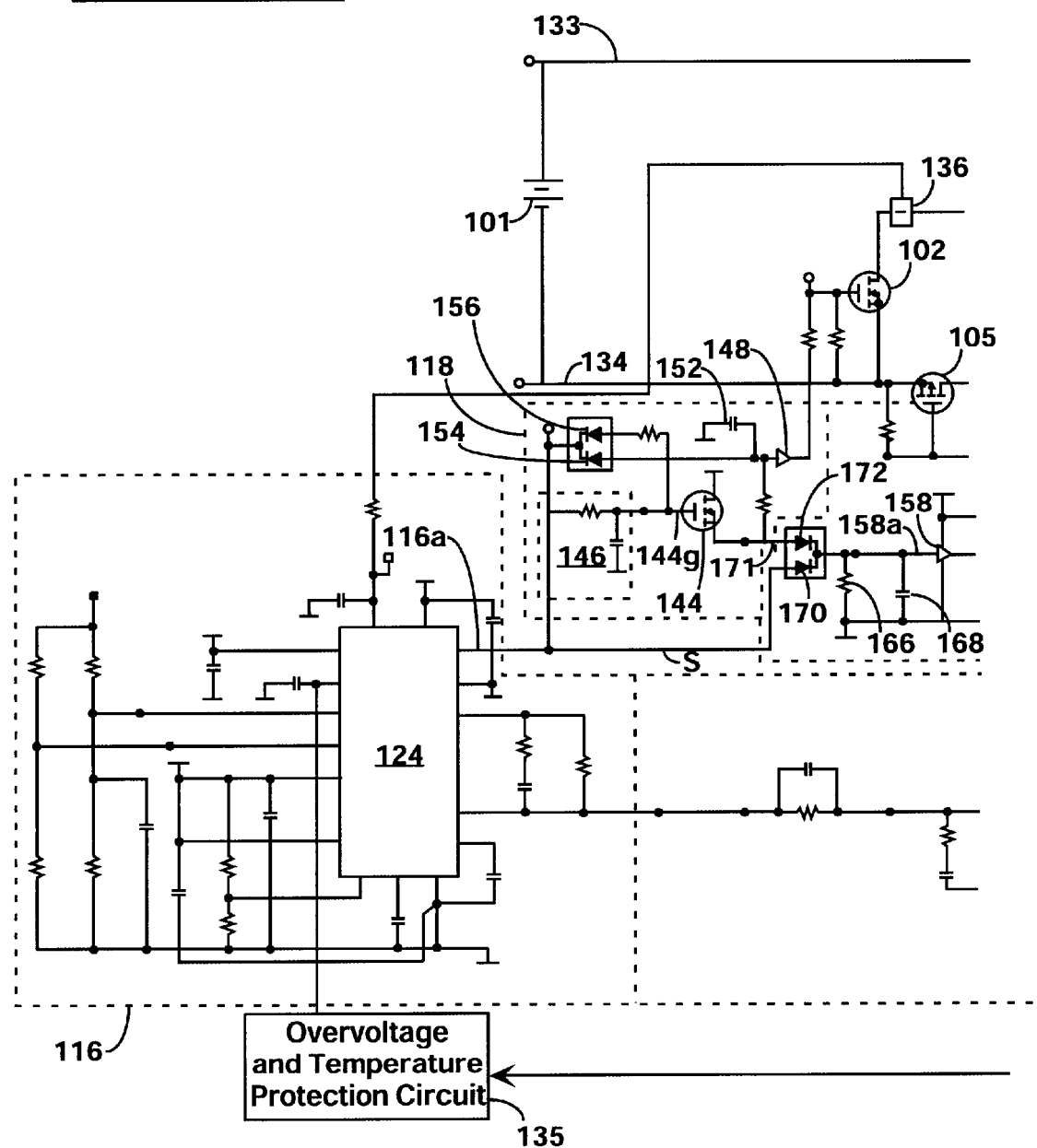
FIGS. 4A and 4B are a detailed schematic diagram of an embodiment of the circuit of FIG. 3.
Figure 4B:
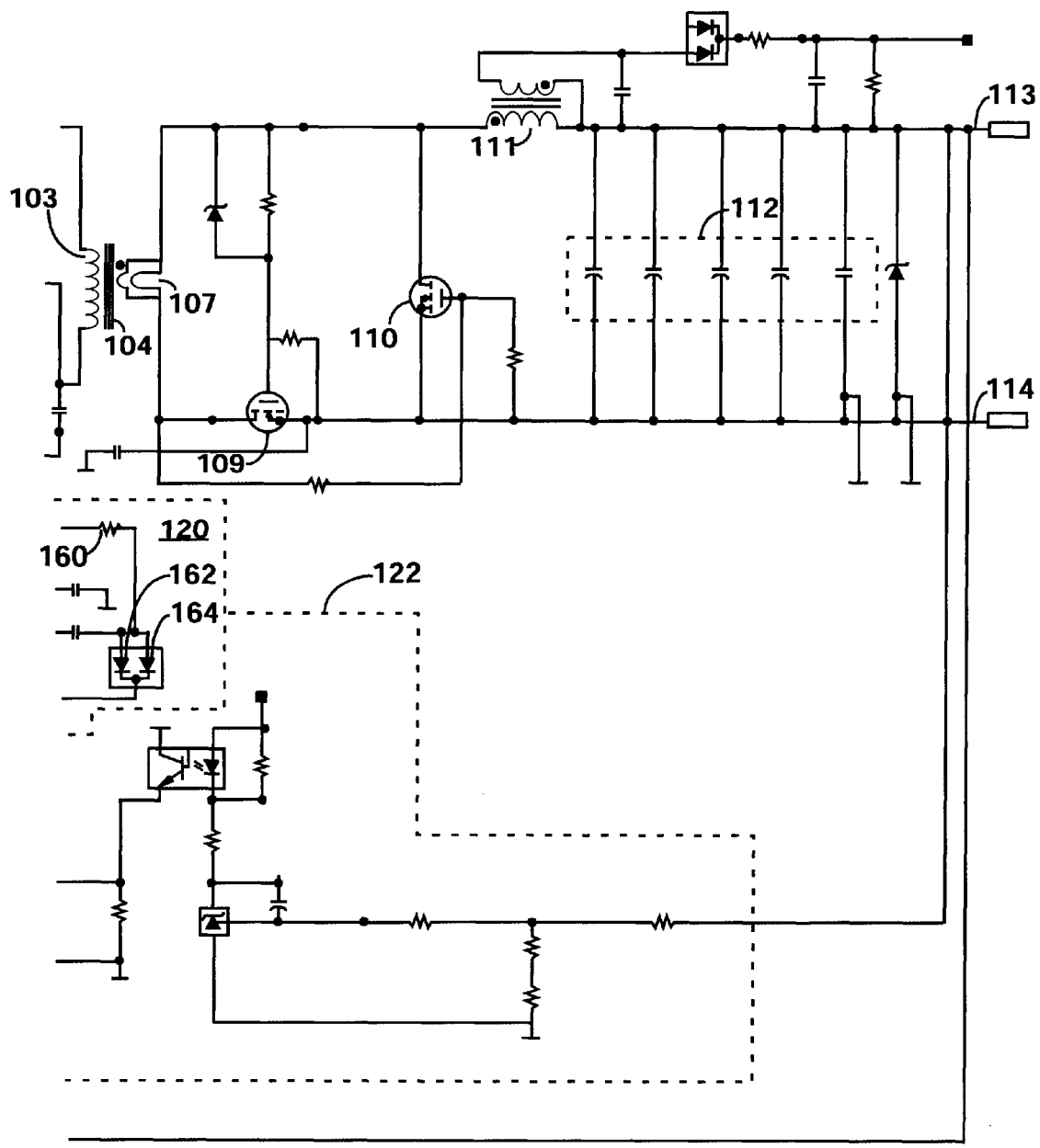

FIGS. 4A and 4B are a detailed schematic diagram of a circuit in accordance with our invention. In FIG. 4, the DC input voltage is applied across terminals 133, 134.

Control circuit 116 is coupled to a sense circuit 122 for sensing the voltage at output leads 113, 114. An integrated circuit 124 (which can be device type CS 51022 manufactured by Cherry Semiconductor of Rhode Island) provides an output signal S on lead 116a which alternates between a high level and a low level. Circuit 124 controls the voltage provided at terminals 113, 114 by controlling the duty cycle of signal S. When signal S transitions from a low state to a high state, a gate 144g of a transistor 144 is pulled high via an RC noise suppression circuit 146. Transistor 144 in turn pulls an input lead of a buffer 148 high via an RC delay circuit comprising a resistor 150 and a capacitor 152. Thus, the two RC circuits within delay circuit 118 ensure that transistor 102 does not turn on until a predetermined time period after signal S goes high from a low state to a high state. However, when signal S goes low, the input lead of buffer 148 and gate 144g of transistor 144 are pulled low almost immediately via diodes 154, 156. This causes the control signal driving power switch 102 to drop quickly, thereby turning off transistor 102. In summary, when signal S goes from a low state to a high state, transistor 102 will not turn on until a predetermined time delay period has elapsed, but when signal S goes from a high state to a low state, transistor 102 turns off almost immediately.

When signal S is in a high state, an input lead 158a of a buffer 158 within delay circuit 120 is pulled high. Buffer 158 is capacitively coupled to gate 105g of transistor 105. However, gate 105g is pulled to ground via resistor 160 and diodes 162, 164. Because source 105s of transistor 105 is at ground, and gate 105g is at ground, transistor 105 is off.

When signal S goes from a high state to a low state, the voltage at input lead 158a of buffer 158 cannot go low until the following happens:
1. First, diode 170 is turned off.
2. Second, the high to low transition of signal S must propagate through RC circuit 146 and transistor 144 to pull lead 171 low and turn diode 172 off.
3. Once diodes 170 and 172 are both off, lead 158a is gradually pulled to ground via an RC circuit comprising a resistor 166 and a capacitor 168.

Eventually, this causes buffer 158 to drive output lead 158b low, which in turn pulls gate 105g of P channel transistor 105 low to turn transistor 105 on. Because of this, when signal S transitions from a high state to a low state, transistor 105 will be turned on, but not until a predetermined time delay has elapsed dependent on the time constant of RC circuit 146 and the RC time constant of the circuit comprising resistor 166 and capacitor 168. In other words, transistor 105 cannot turn on until a safe time delay after transistor 102 is off.

When signal S transitions from a low state to a high state, input lead 158a of buffer 158 is pulled high immediately via diode 170, thereby causing buffer 158 to drive lead 158b high immediately, and turning off transistor 105 immediately.

Figure 9:
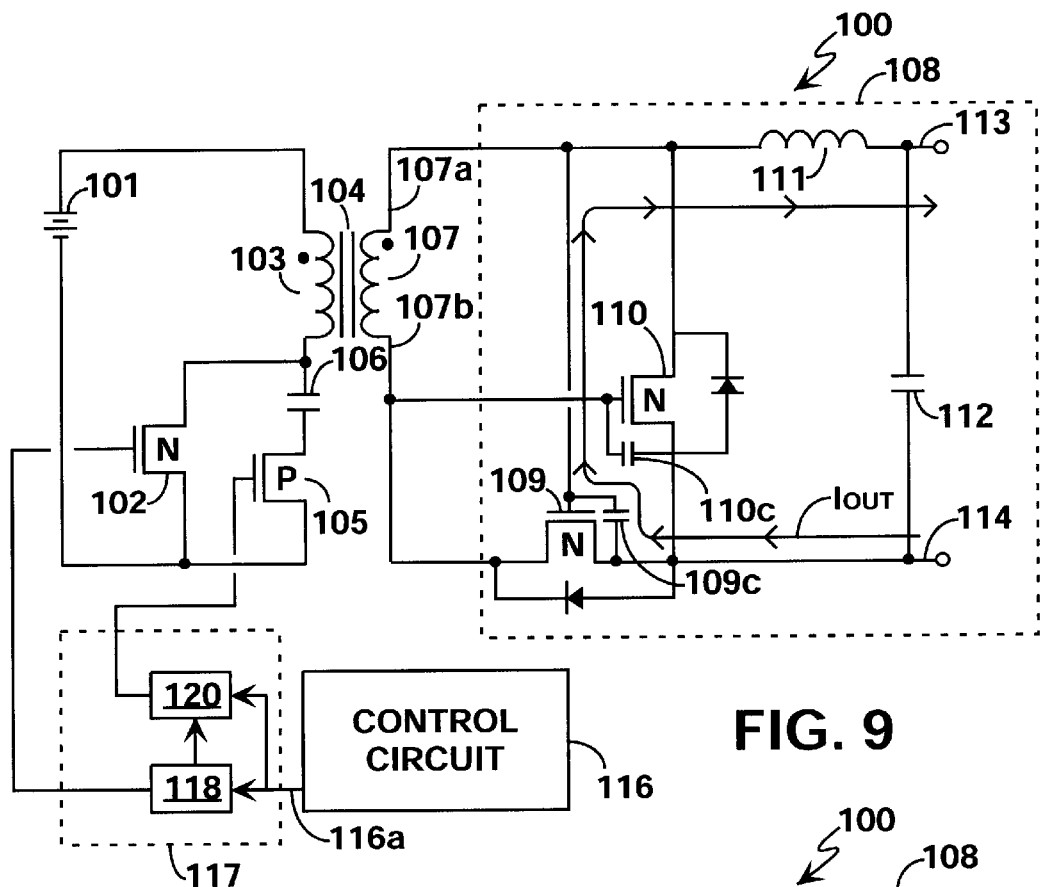
FIG. 9 illustrates the current path in the circuit of FIG. 3 during a first delay period.

It will be readily seen, therefore, that delay circuits 118 and 120 cooperate to ensure that there is a first delay period between the time transistor 102 turns off and the time transistor 105 turns on, and a second delay period between the time transistor 105 turns off and the time transistor 102 turns on. At the end of the power transfer cycle, switch 102 opens. Switch 105 is not closed until the first time delay period has elapsed. The output current is allowed to discharge the input capacitance of transistor 109 and turn off transistor 109. FIG. 9 shows the current path in circuit 100 as the output current $I_{out}$ discharges the input capacitance of transistor 109 (represented schematically by capacitor 109c) during the first delay period. Current previously flowing through transistor 109 is then diverted through its parallel diode. (In the embodiment of FIG. 4, this parallel diode is the body diode of transistor 109. However, instead of relying on the body diode, a fast diode can be coupled in parallel with transistor 109.) After the first delay period, transistor 105 is turned on, initiating the freewheeling cycle. Because switch 109 is open, no cross conduction will occur when switch 110 is closed.

Figure 10:
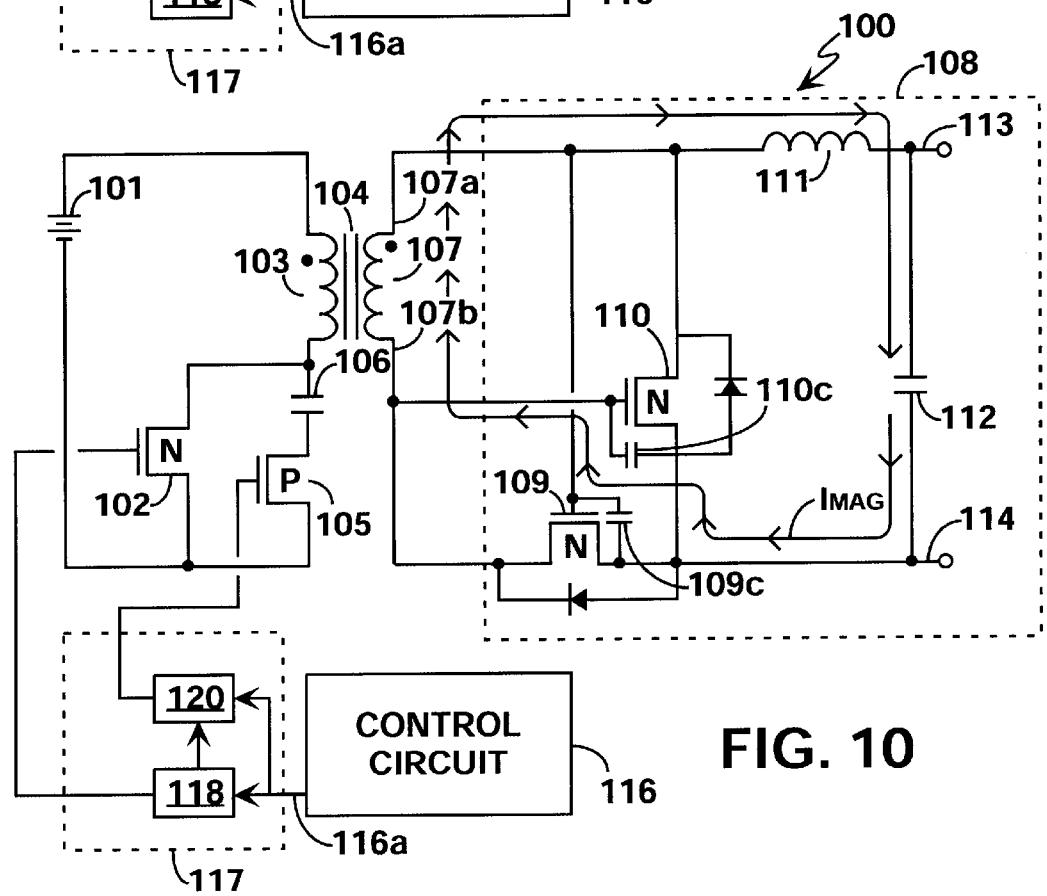
FIG. 10 illustrates the current path in the circuit of FIG. 3 during a second delay period.

During the second delay period the voltage across windings 103 and 107 drops to zero. The magnetizing current is allowed to discharge the gate capacitance of transistor 110. Transistor 110 loses its driving signal and turns off. FIG. 10 show the current path in circuit 100 as the magnetizing current $I_{mag}$ discharges the gate capacitance of transistor 110 (represented schematically as capacitor 110c) during the second delay period. Current previously flowing through transistor 110 is diverted to its parallel diode. (This may be the body diode of transistor 110 or a separate diode coupled in parallel with transistor 110.)

After the second delay period has elapsed, switch 102 closes, and subsequently switch 109 closes, initiating the power transfer cycle. Because switch 110 is open, no cross-conduction will occur when switch 109 is closed. The delay produced by circuits 118 and 120 is typically between 200 and 500 ns. If the delay is too short, cross conduction occurs in transistors 109, 110. If the delay is too long, circuit efficiency suffers. The required delay depends upon circuit parameters, and in other embodiments, other time delay values can be used.

Although not critical to our invention, FIG. 4 shows a circuit 135 for shutting down the power supply in the event of excessive temperature or excessive voltage across leads 113, 114. Also shown is a current sense circuit 136 for sensing current flowing from winding 103 through switch 102 and permitting current mode control. Circuits 135 and 136 are not critical to our invention and will not be discussed in detail.

In FIG. 4, winding 107 is shown as two 1-turn windings connected in parallel (which reduces electrical resistance therein), inductor 111 is implemented as a transformer, and capacitor 112 comprises several capacitors connected in parallel. However, in other embodiments, these structures can be implemented in other ways.

Figure 5:
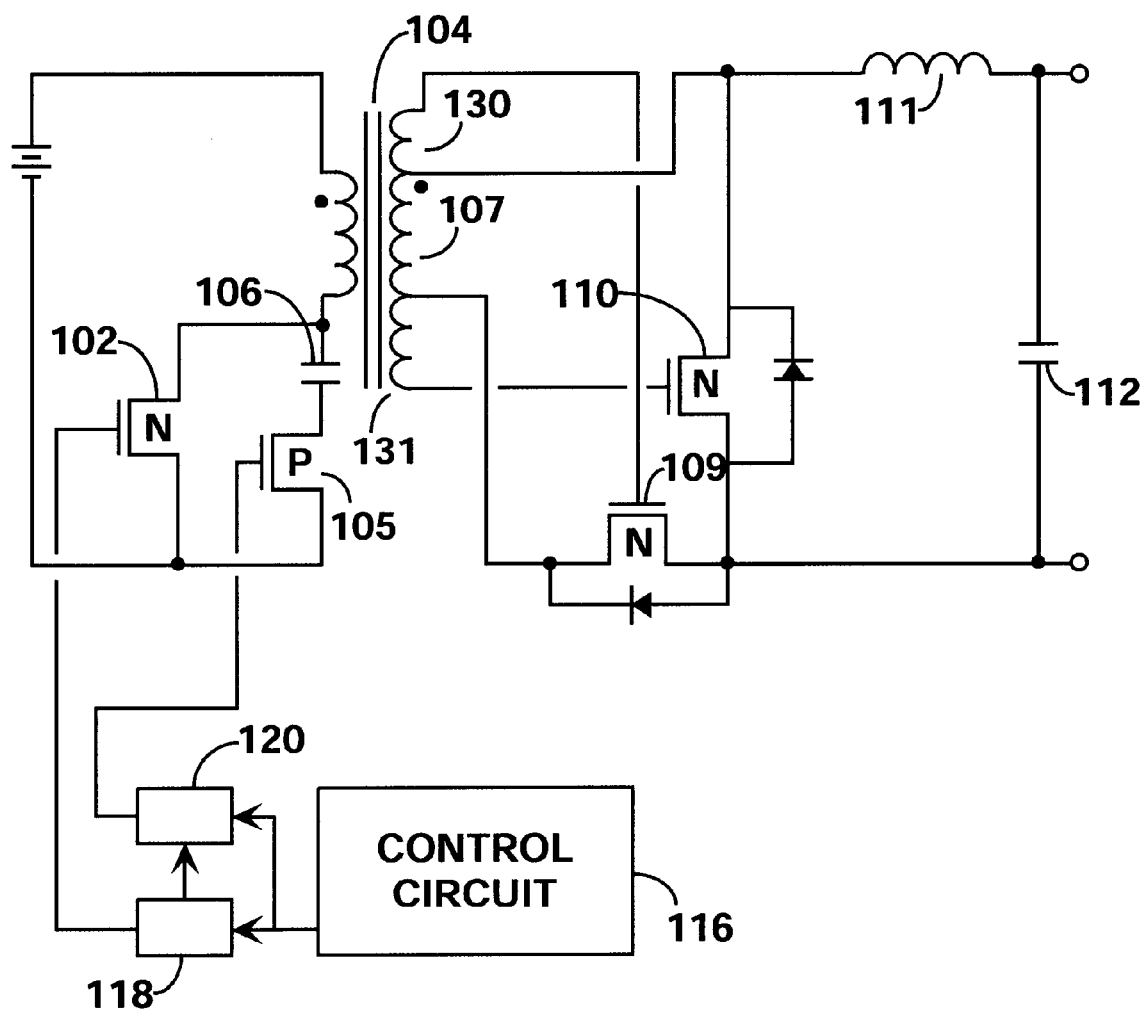
FIG. 5 illustrates an embodiment of our invention in which extra windings are provided on the main transformer for controlling the synchronous rectifiers.

FIG. 5 illustrates another embodiment of our invention in which extra windings 130, 131 of transformer 104 provide the gate control signals for rectifiers 109, 110. The operation of the circuit of FIG. 5 is substantially the same as that of FIG. 3 except that windings 130, 131 provide a somewhat larger gate drive voltage to synchronous rectifiers 109, 110.

Figure 6:
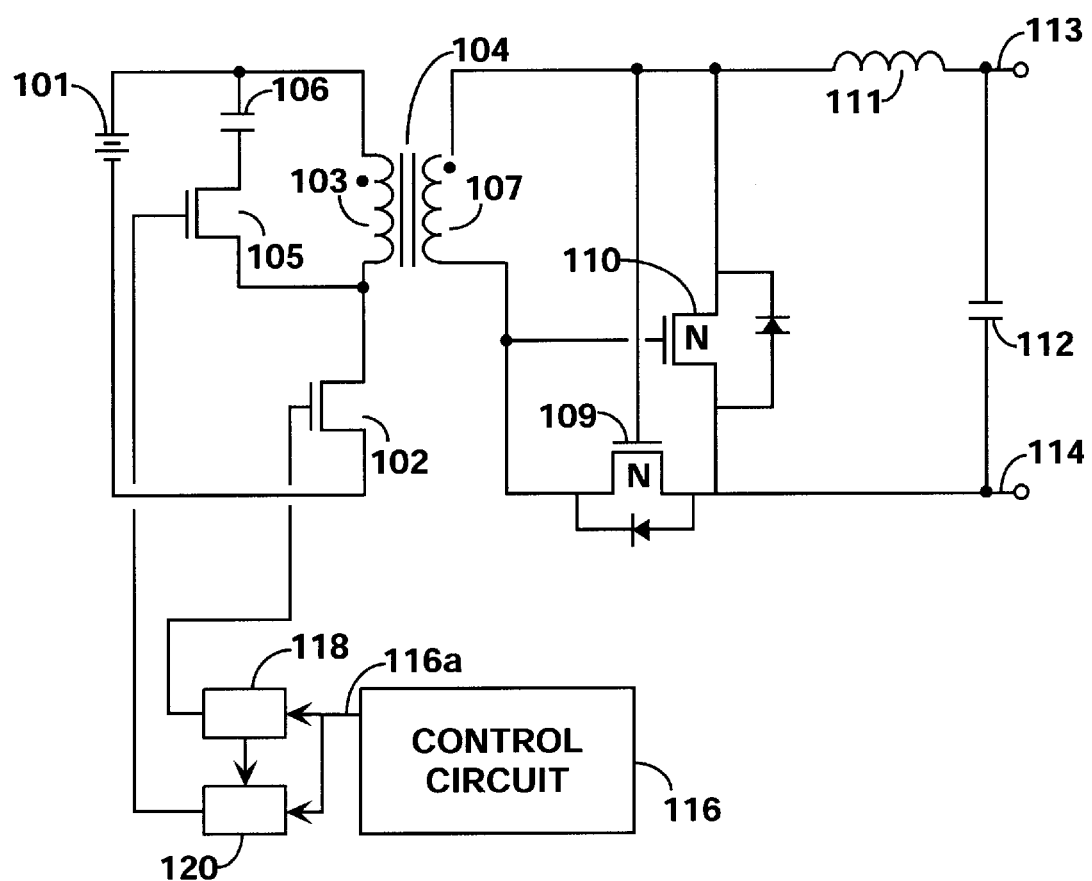
FIG. 6 illustrates an embodiment of our invention in which the reset circuit is connected directly across the primary winding of the main transformer.

FIG. 6 illustrates another embodiment of our invention in which the reset circuit comprising switch 105 and capacitor 106 is coupled directly across primary winding 103 of transformer 104. The circuit of FIG. 5 operates in a manner substantially similar to that of the reset FIG. 3, except in FIG. 5, capacitor 106 stores a voltage equal to the reset voltage applied to winding 103, whereas in FIG. 3, capacitor 106 stores a voltage equal to that reset voltage minus the input voltage.

Figure 7:
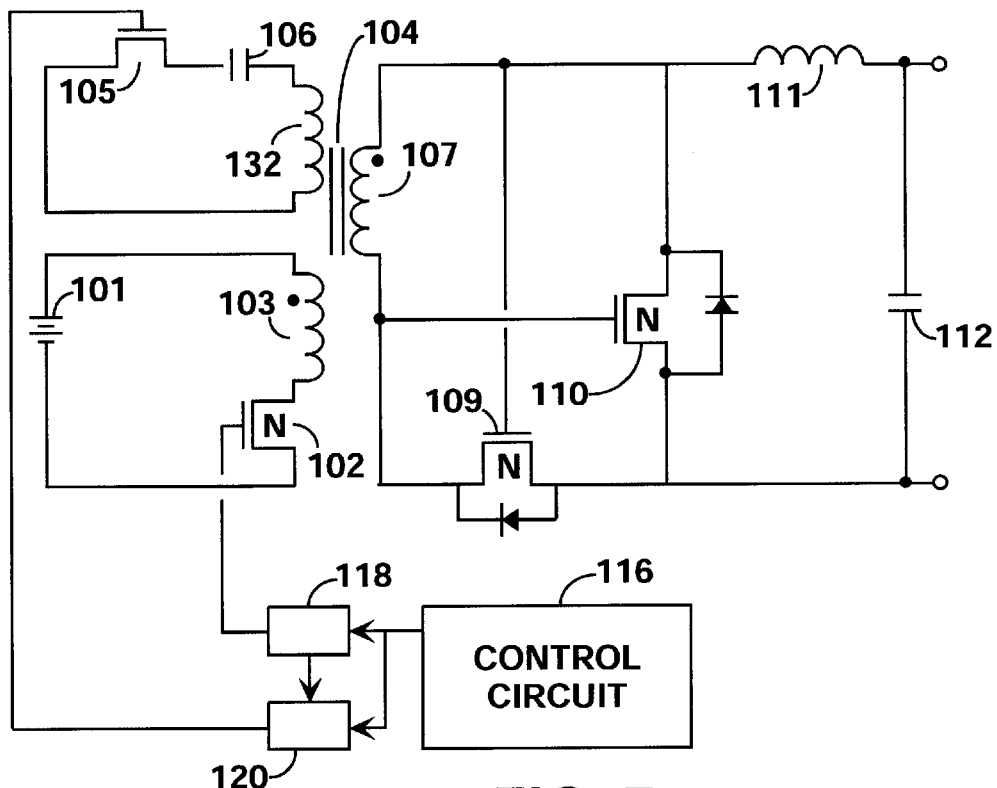
FIG. 7 illustrates an embodiment of our invention in which the reset circuit is connected across a tertiary winding of the main transformer.

FIG. 7 illustrates another embodiment of our invention in which reset circuit comprising switch 105 and capacitor 106 is coupled across a tertiary winding 132 of transformer 104. In FIG. 7, the reset voltage is applied across winding 132 to reset transformer 104.

Figure 8:
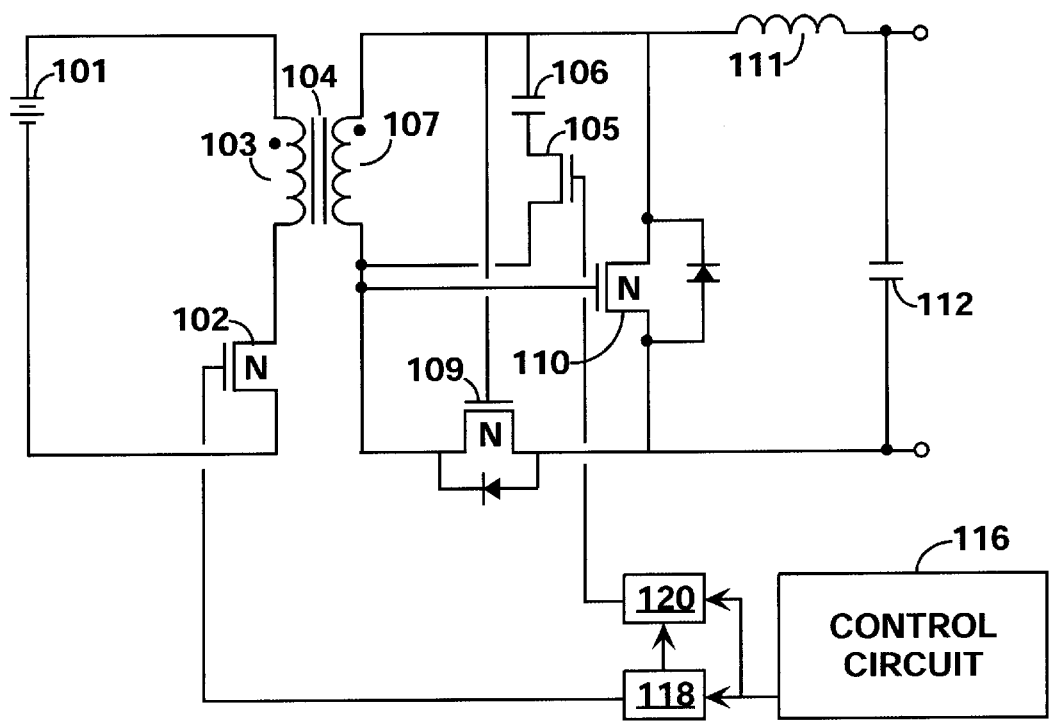
FIG. 8 illustrates an embodiment of our invention in which the reset circuit is connected across the secondary winding of the main transformer.

FIG. 8 illustrates another embodiment of our invention in which the reset circuit comprising switch 105 and capacitor 106 is coupled across the secondary winding of transformer 107.

While the invention has been described with respect to specific embodiments of our invention, those skilled in the art will appreciate that changes can be made in form and detail without departing from the spirit and scope of our invention. For example, the main and reset switches can be MOS transistors, bipolar transistors, or other types of switching devices. In lieu of a choke inductor such as inductor 111, a transformer can be used, e.g. as shown in FIG. 4. The order of circuit elements coupled in series (e.g. switch 102 and input voltage source 101 in FIGS. 6, 7 and 8) can be changed. In other embodiments, an output from delay circuit 118 is not coupled to delay circuit 120. For example, in other embodiments, diode 172 does not couple lead 171 to lead 158a (see FIG. 4). Accordingly, all such embodiments come within our invention.

We claim:

1. A circuit, comprising:
   a transformer including primary and secondary windings;
   a primary switch, including a control terminal, for coupling an input voltage to the transformer;
   a reset circuit including a control terminal, wherein the reset circuit is connected to the transformer;
   a rectification circuit connected to the secondary winding of the transformer and having a pair of output terminals;
   a duty cycle control circuit having first and second input terminals and an output terminal, wherein the first and second input terminals are connected to the pair of output terminals of the rectification circuit;
   a first RC delay circuit connected between the output terminal of the duty cycle control circuit and the control terminal of the primary switch; and
   means for resetting the first RC delay.

2. The circuit of claim 1, wherein the rectification circuit includes first and second synchronous rectifiers.

3. The circuit of claim 2, wherein the first and second synchronous rectifiers include MOS transistors.

4. The circuit of claim 1, wherein the reset circuit includes a reset switch connected in series with a capacitor.

5. The circuit of claim 4, wherein the primary switch is a N-MOS transistor and the reset switch is a P-MOS transistor.

6. The circuit of claim 1, wherein the means for resetting the first RC circuit includes means for resetting the first RC delay circuit on a falling edge of an output signal from the duty cycle control circuit.

7. The circuit of claim 1, wherein the means for resetting the first RC delay circuit includes a first diode having an anode connected to the control terminal of the primary switch and a cathode connected to the output terminal of the duty cycle control circuit.

8. The circuit of claim 1, further comprising:
   an RC noise suppression circuit connected between the output terminal of the duty cycle control circuit and the first RC delay circuit; and
   means for resetting the RC noise suppression circuit.

9. The circuit of claim 8, wherein:
   the means for resetting the first RC circuit includes means for resetting the first RC delay circuit on a falling edge of an output signal from the duty cycle control circuit; and
   the means for resetting the RC noise suppression circuit includes means for resetting the RC noise suppression circuit on the falling edge of the output signal from the duty cycle control circuit.

10. The circuit of claim 8, wherein the means for resetting the RC noise suppression circuit includes a second diode having an anode connected to the RC noise suppression circuit and a cathode connected to the output terminal of the duty cycle control circuit.

11. The circuit of claim 1, further comprising:
   a second RC delay circuit connected between the output terminal of the duty cycle control circuit and the control terminal of the reset circuit; and
   means for resetting the second RC delay circuit.

12. The circuit of claim 11, wherein:

the means for resetting the first RC circuit includes means for resetting the first RC delay circuit on a falling edge of an output signal from the duty cycle control circuit; and the means for resetting the second RC delay circuit includes means for resetting the second RC delay circuit a rising edge of the output signal from the duty cycle control circuit.

13. The circuit of claim 12, wherein the means for resetting the second RC delay circuit includes a third diode having an anode connected to the control terminal of the reset circuit and a cathode connected to a first voltage rail.

14. The circuit of claim 1, further comprising a buffer connected between the first RC delay circuit and the control terminal of the primary switch.

15. The circuit of claim 14, further comprising a transistor having a control terminal and a conduction path between first and second terminals, wherein the control terminal is connected to the output terminal of the duty cycle control circuit, the first terminal is connected to a second voltage rail, and the second terminal is connected to an input terminal of the buffer.

16. A circuit, comprising:
a transformer including primary and secondary windings;
a primary switch, including a control terminal, for coupling an input voltage to the transformer;
a reset circuit including a control terminal, wherein the reset circuit is connected to the transformer;
a rectification circuit connected to the secondary winding of the transformer and having a pair of output terminals;
a duty cycle control circuit having first and second input terminals and an output terminal, wherein the first and second input terminals are connected to the pair of output terminals of the rectification circuit;
a first RC delay circuit connected between the output terminal of the duty cycle control circuit and the control terminal of the primary switch; and
a first diode having an anode connected to the control terminal of the primary switch and a cathode connected to the output terminal of the duty cycle control circuit.

17. The circuit of claim 16, further comprising:
an RC noise suppression circuit connected between the output terminal of the duty cycle control circuit and the first RC delay circuit; and
a second diode having an anode connected to the RC noise suppression circuit and a cathode connected to the output terminal of the duty cycle control circuit.

18. The circuit of claim 17, further comprising:
a second RC delay circuit connected between the output terminal of the duty cycle control circuit and the control terminal of the reset circuit; and
a third diode having an anode connected to the control terminal of the reset circuit and a cathode connected to a first voltage rail.

19. The circuit of claim 18, further comprising a first buffer having an input terminal connected to the first RC delay circuit and an output terminal connected to the control terminal of the primary switch.

20. The circuit of claim 19, further comprising a transistor having a control terminal and a conduction path between first and second terminals, wherein the control terminal is connected to the output terminal of the duty cycle control circuit, the first terminal is connected to a second voltage rail, and the second terminal is connected to the input terminal of the first buffer.

21. The circuit of claim 20, further comprising a second buffer connected between the output terminal of the duty cycle control terminal and the control terminal of the reset circuit.

22. The circuit of claim 21, further comprising a fourth diode having an anode connected to the output terminal of the duty cycle control circuit and a cathode connected to an input terminal of the second buffer.

23. The circuit of claim 22, further comprising a fifth diode having an anode connected to the second terminal of the transistor and a cathode connected to the input terminal of the second buffer.

24. A control circuit for an active reset forward converter, the converter including a primary switch connected to a transformer, a reset circuit connected to the transformer, and a rectification circuit connected to the transformer, comprising:
a duty cycle control circuit having first and second input terminals and an output terminals, wherein the first and second input terminals are connected to output terminals of rectification circuit;
a first RC delay circuit connected between the output terminal of the duty cycle control circuit and a control terminal of the primary switch; and
means for resetting the first RC delay.

25. The control circuit of claim 24, wherein the means for resetting the first RC circuit includes means for resetting the first RC delay circuit on a falling edge of an output signal from the duty cycle control circuit.

26. The control circuit of claim 24, wherein the means for resetting the first RC delay circuit includes a first diode having an anode connected to the control terminal of the primary switch and a cathode connected to the output terminal of the duty cycle control circuit.

27. The control circuit of claim 24, further comprising:
an RC noise suppression circuit connected between the output terminal of the duty cycle control circuit and the first RC delay circuit; and
means for resetting the RC noise suppression circuit.

28. The control circuit of claim 27, wherein:
the means for resetting the first RC circuit includes means for resetting the first RC delay circuit on a falling edge of an output signal from the duty cycle control circuit; and
the means for resetting the RC noise suppression circuit includes means for resetting the RC noise suppression circuit on the falling edge of the output signal from the duty cycle control circuit.

29. The control circuit of claim 27, wherein the means for resetting the RC noise includes a second diode having an anode connected to the RC noise suppression circuit and a cathode connected to the output terminal of the duty cycle control circuit.

30. The control circuit of claim 24, further comprising:
a second RC delay circuit connected between the output terminal of the duty cycle control circuit and the control terminal of the reset circuit; and
means for resetting the second RC delay circuit.

31. The control circuit of claim 30, wherein:
the means for resetting the first RC circuit includes means for resetting the first RC delay circuit on a falling edge of an output signal from the duty cycle control circuit; and
the means for resetting the second RC delay circuit includes means for resetting the second RC delay circuit a rising edge of the output signal from the duty cycle control circuit.

32. The control circuit of claim 30, wherein the means for resetting the second RC delay circuit includes a third diode having an anode connected to the control terminal of the reset circuit and a cathode connected to a first voltage rail.

33. A control circuit for an active reset forward converter, the converter including a primary switch connected to a transformer, a reset circuit connected to the transformer, and a rectification circuit connected to the transformer, comprising:

a duty cycle control circuit having first and second input terminals and an output terminals, wherein the first and second input terminals are connected to output terminals of rectification circuit;

a first RC delay circuit connected between the output terminal of the duty cycle control circuit and a control terminal of the primary switch; and a first diode having an anode connected to the control terminal of the primary switch and a cathode connected to the output terminal of the duty cycle control circuit.

34. The control circuit of claim 33, further comprising:

an RC noise suppression circuit connected between the output terminal of the duty cycle control circuit and the first RC delay circuit; and a second diode having an anode connected to the RC noise suppression circuit and a cathode connected to the output terminal of the duty cycle control circuit.

35. The control circuit of claim 34, further comprising:

a second RC delay circuit connected between the output terminal of the duty cycle control circuit and the control terminal of the reset circuit; and a third diode having an anode connected to the control terminal of the reset circuit and a cathode connected to a first voltage rail.

36. The control circuit of claim 35, further comprising a fourth diode having an anode connected to the output terminal of the duty cycle control circuit and a cathode connected to the second RC delay circuit.

37. A circuit, comprising:

a transformer including primary and secondary windings;

a primary switch including a control terminal and a conduction path, wherein the conduction path is in series with the primary winding;

a reset switch including a control terminal and a conduction path, wherein the conduction path of the reset switch is in series with the primary winding, and wherein the conduction path of the reset switch is in parallel with the conduction path of the primary switch;

a capacitor connected in series with the conduction path of the reset switch;

a rectification circuit connected to the secondary winding of the transformer and having a pair of output terminals;

a duty cycle control circuit having first and second input terminals and an output terminal, wherein the first and second input terminals are connected to the pair of output terminals of the rectification circuit;

a first RC delay circuit connected between the output terminal of the duty cycle control circuit and the control terminal of the primary switch; and a first diode having an anode connected to the control terminal of the primary switch and a cathode connected to the output terminal of the duty cycle control circuit.

38. The control circuit of claim 37, further comprising:

an RC noise suppression circuit connected between the output terminal of the duty cycle control circuit and the first RC delay circuit; and a second diode having an anode connected to the RC noise suppression circuit and a cathode connected to the output terminal of the duty cycle control circuit.

39. The control circuit of claim 38, further comprising:

a second RC delay circuit connected between the output terminal of the duty cycle control circuit and the control terminal of the reset switch; and a third diode having an anode connected to the control terminal of the reset switch and a cathode connected to a first voltage rail.

40. The control circuit of claim 39, further comprising a fourth diode having an anode connected to the output terminal of the duty cycle control circuit and a cathode connected to the second RC delay circuit.

41. A method for ensuring that synchronous rectifiers of an active forward reset converter are not simultaneously conducting, wherein the synchronous rectifiers are responsive to a voltage across a secondary winding of a transformer of the converter, comprising:

producing a duty cycle control signal responsive to an output voltage of the converter, such that the duty cycle control signal transitions between a first level and a second level;

biasing a primary switch of the converter with the duty cycle control signal for a first time period such that an input voltage to the converter to coupled to a primary winding of the transformer for the first time period, wherein biasing of the primary switch is initiated after a first delay after a transition of the duty cycle control signal from the first level to the second level and terminates substantially immediately upon a transition of the duty cycle control signal from the second level to the first level;

biasing a reset switch of the converter with the duty cycle control signal for a second time period such that a reset voltage is coupled to the primary winding for the second time period, wherein biasing of the reset switch is initiated after a second delay after the transition of the duty cycle control signal from the second level to the first level and terminates substantially immediately upon the transition of the duty cycle control signal first level to the second level, wherein the first and second delay are sufficiently long such that the synchronous rectifiers are not simultaneously conducting.

42. The method of claim 41, wherein:

biasing the primary switch includes initiating biasing the primary switch after a first delay after a rising transition of the duty cycle control signal and terminating biasing of the primary switch substantially immediately upon a falling transition of the duty cycle control signal; and biasing the reset switch includes initiating biasing the reset switch after a second delay after a falling transition of the duty cycle control signal and terminating biasing the reset switch substantially immediately upon a rising transition of the duty cycle control signal.

43. The method of claim 42, wherein initiating biasing of the primary switch after a first delay after a rising transition of the duty cycle control signal includes propagating the duty cycle control signal through a first RC delay circuit prior to biasing the primary switch.

44. The method of claim 43, wherein terminating biasing of the primary switch substantially immediately upon a falling transition of the duty cycle control signal includes resetting the first RC delay circuit substantially immediately upon a falling transition of the duty cycle control signal.

45. The method of claim 44, wherein
initiating biasing of the reset switch after a second delay after a falling transition of the duty cycle control signal includes propagating the duty cycle control signal through a second RC delay circuit prior to biasing the reset switch; and
terminating biasing of the reset switch substantially immediately upon a rising transition of the duty cycle control signal includes resetting the second RC delay circuit substantially immediately upon a rising transition of the duty cycle control signal.

46. The method of claim 45, wherein:
initiating biasing of the primary switch includes propagating the duty cycle control signal through an RC noise suppression circuit and the first RC delay circuit prior to biasing the primary switch; and
initiating biasing of the reset switch includes propagating the duty cycle control signal through the RC noise suppression circuit and the second RC delay circuit prior to biasing the reset switch.

47. A forward converter, comprising:
a transformer including primary and secondary windings;
a primary switch, including a control terminal, for coupling an input voltage to the transformer;
a reset circuit including a control terminal, wherein the reset circuit is connected to the transformer;
a rectification circuit connected to the secondary winding of the transformer for converting a voltage across the secondary winding to an output voltage, wherein the rectification circuit includes a pair of synchronous rectifiers;
a duty cycle control circuit for producing a control signal at an output terminal thereof in response to the output voltage;
a first RC delay circuit connected between the output terminal of the duty cycle control circuit and the control terminal of the primary switch; and
means for resetting the first RC delay circuit.

48. The circuit of claim 47, wherein the reset circuit includes a reset switch connected in series with a capacitor.

49. The circuit of claim 48, wherein the primary switch is a N-MOS transistor and the reset switch is a P-MOS transistor.

50. The circuit of claim 47, wherein the means for resetting the first RC circuit includes means for resetting the first RC delay circuit on a falling edge of the control signal from the duty cycle control circuit.

51. The circuit of claim 47, wherein the means for resetting the first RC delay circuit includes a first diode having an anode connected to the control terminal of the primary switch and a cathode connected to the output terminal of the duty cycle control circuit.

52. The circuit of claim 47, further comprising:
an RC noise suppression circuit connected between the output terminal of the duty cycle control circuit and the first RC delay circuit; and
means for resetting the RC noise suppression circuit.

53. The circuit of claim 52, wherein:
the means for resetting the first RC circuit includes means for resetting the first RC delay circuit on a falling edge of the control signal from the duty cycle control circuit; and
the means for resetting the RC noise suppression circuit includes means for resetting the RC noise suppression circuit on the falling edge of the control signal from the duty cycle control circuit.

54. The circuit of claim 52, wherein the means for resetting the RC noise suppression circuit includes a second diode having an anode connected to the RC noise suppression circuit and a cathode connected to the output terminal of the duty cycle control circuit.

55. The circuit of claim 47, further comprising:
a second RC delay circuit connected between the output terminal of the duty cycle control circuit and the control terminal of the reset circuit; and
means for resetting the second RC delay circuit.

56. The circuit of claim 55, wherein:
the means for resetting the first RC circuit includes means for resetting the first RC delay circuit on a falling edge of the control signal from the duty cycle control circuit; and
the means for resetting the second RC delay circuit includes means for resetting the second RC delay circuit a rising edge of the output signal from the duty cycle control circuit.

57. The circuit of claim 56, wherein the means for resetting the second RC delay circuit includes a third diode having an anode connected to the control terminal of the reset circuit and a cathode connected to a first voltage rail.

58. The circuit of claim 47, further comprising a buffer connected between the first RC delay circuit and the control terminal of the primary switch.

59. The circuit of claim 58, further comprising a transistor having a control terminal and a conduction path between first and second terminals, wherein the control terminal is connected to the output terminal of the duty cycle control circuit, the first terminal is connected to a second voltage rail, and the second terminal is connected to an input terminal of the buffer.

* * * * *